(12) United States Patent
Xu et al.

(10) Patent No.: US 10,849,107 B2
(45) Date of Patent: *Nov. 24, 2020

(54) ELECTRONIC DEVICE ON USER EQUIPMENT SIDE IN WIRELESS COMMUNICATION SYSTEM AND WIRELESS COMMUNICATION METHOD

(71) Applicant: Sony Corporation, Tokyo (JP)

(72) Inventors: Xiaodong Xu, Beijing (CN); Chengcheng Yang, Beijing (CN); Weiyang Lin, Beijing (CN); Ce Wang, Beijing (CN); Nannan Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/400,042

(22) Filed: May 1, 2019

(65) Prior Publication Data

US 2019/0261322 A1 Aug. 22, 2019

Related U.S. Application Data

(63) Continuation of application No. 15/310,329, filed as application No. PCT/CN2015/081048 on Jun. 9, 2015, now Pat. No. 10,327,227.

(30) Foreign Application Priority Data

Jun. 17, 2014 (CN) .......................... 2014 1 0269832

(51) Int. Cl.
H04W 72/04 (2009.01)
H04W 72/02 (2009.01)
(Continued)

(52) U.S. Cl.
CPC .......... *H04W 72/04* (2013.01); *H04L 1/1812* (2013.01); *H04W 72/02* (2013.01); *H04W 76/14* (2018.02);
(Continued)

(58) Field of Classification Search
CPC ..... H04W 72/04; H04W 76/14; H04W 72/02; H04W 88/02; H04W 74/0833;
(Continued)

(56) References Cited

U.S. PATENT DOCUMENTS 10,327,227 B2 * 6/2019 Xu ........................ H04W 72/04
2011/0275382 A1 11/2011 Hakola et al.
(Continued)

FOREIGN PATENT DOCUMENTS

CN 101594632 A 12/2009
CN 103179575 A 6/2013

OTHER PUBLICATIONS

3GPP R1-133495, "D2D Communication without network coverage", Aug. 23, 2013.
(Continued)

*Primary Examiner* — Jae Y Lee
(74) *Attorney, Agent, or Firm* — Xsensus LLP

(57) ABSTRACT

An electronic device on a user equipment side in a wireless communication system and a wireless communication method. The electronic device includes: a communication unit, configured to implement device-to-device (D2D) communication under a cellular communication protocol with multiple user equipments, to directly send data and/or control information to the multiple user equipments; and a configuration unit, configured to configure, for a first user equipment and a second user equipment in the multiple user equipments, resources and a modulation and coding scheme (MCS) for implementing D2D communication between the
(Continued)

first user equipment and the second user equipment, wherein the second user equipment is a candidate that the first user equipment implements D2D communication with, and the communication unit send information indicating the resources and the MCS to the first user equipment and the second user equipment.

12 Claims, 8 Drawing Sheets

(51) Int. Cl.
    *H04W 76/14*     (2018.01)
    *H04L 1/18*     (2006.01)
    *H04W 36/00*     (2009.01)
    *H04W 72/08*     (2009.01)
    *H04W 74/08*     (2009.01)
    *H04W 88/02*     (2009.01)

(52) U.S. Cl.
    CPC ........ *H04W 36/0055* (2013.01); *H04W 72/08* (2013.01); *H04W 74/0833* (2013.01); *H04W 88/02* (2013.01); *Y02D 70/00* (2018.01)

(58) Field of Classification Search
    CPC . H04W 72/08; H04W 36/0055; H04W 24/10; H04L 1/1812; Y02D 70/00
    See application file for complete search history.

(56) References Cited

U.S. PATENT DOCUMENTS

| | | | |
|---|---|---|---|
| 2012/0106517 A1* | 5/2012 | Charbit | H04W 72/04 |
| | | | 370/336 |
| 2014/0328310 A1 | 11/2014 | Xu | |
| 2015/0271840 A1* | 9/2015 | Tavildar | H04L 1/00 |
| | | | 370/329 |
| 2015/0334757 A1* | 11/2015 | Seo | H04W 76/14 |
| | | | 370/329 |
| 2016/0183251 A1 | 6/2016 | Zhu et al. | |

OTHER PUBLICATIONS

International Search Report and Written Opinion dated Sep. 9, 2015 in PCT/CN2015/081048 filed Jun. 9, 2015.

* cited by examiner

ELECTRONIC DEVICE ON USER EQUIPMENT SIDE IN WIRELESS COMMUNICATION SYSTEM AND WIRELESS COMMUNICATION METHOD

CROSS-REFERENCE TO RELATED APPLICATIONS

This application is a continuation of U.S. application Ser. No. 15/310,329, filed on Nov. 10, 2016, which is based on PCT filing PCT/CN2015/081048, filed on Jun. 9, 2015, and claims priority to CN 201410269832.3, filed on Jun. 17, 2014, the entire contents of each are incorporated herein by reference.

FIELD

The present disclosure relates to the field of wireless communication technology, and particularly to an electronic device on a user equipment side in a wireless communication system and a wireless communication method in the wireless communication system.

BACKGROUND

This part provides background information related to the present disclosure, and it is not necessary to be the prior art.

The D2D (Device-to-Device) communication technology refers to an information transmission way, in which, a cellular communication UE (User Equipment) performs data interaction directly in a way of terminal direct connection. Compared with traditional cellular communication, in the D2D communication, a spectrum resource is reused, a transmission distance is short and information is not relayed through a base station, therefore the D2D communication can increase a spectrum utilization ratio, decrease a transmission power of the UE and load of the base station. In a case that a DUE (Device-to-Device User Equipment) which is performing the D2D communication is to switch from a D2D communication mode to a traditional cellular communication mode, design for a switch flow and an involved signaling is a part not involved in current standard work. However, since that the switch from the D2D communication mode to the traditional cellular communication mode is different from a traditional switch mechanism of the UE from a base station to another base station, and reflects that a communication target of the UE is switched from a UE to a base station, that is, from a nontraditional communication mode to a traditional communication mode, the switch flow in this mechanism needs to be planed and designed according a particular scenario, thereby ensuring rationality and reliability of the switch flow while reducing signaling overhead to the greatest extend.

In addition, D2D broadcasting is an important concern of the current 3GPP (3rd Generation Partnership Project) RAN1 (Radio Access Network), and is mainly applied to the field of public safety. The D2D broadcasting is point to multiple points communication, a source DUE is a broadcasting source UE for providing a broadcasting service, and the source DUE provides same information to the remaining DUEs, and does not receive feedback information from the UE. Due to a particular factor, the D2D communication is switched to other mode from the broadcasting mode in a case that quality of a D2D broadcasting link gets worse and can not meet a service requirement of a receiving DUE, to ensure completeness of receiving the information. However, a specific flow and scheme for switching the D2D communication from the broadcasting mode to the other mode is not discussed in the conventional technology, for example, which entity and how to trigger the mode switch without the feedback information. In some known study, a UE cluster is constructed in a case that multiple DUEs which meet a certain distance condition have a communication requirement. An advantage of the D2D communication cluster is centralized control, that is, the base station maintains traditional links with only a few UEs in the cluster, this is equivalent to that all UEs in the cluster maintains traditional links with the base station. One DUE in the DUE cluster is set as a cluster head, the cluster head maintains a traditional link with the base station, and is responsible for forwarding information from the base station. A node except the cluster head in the DUE cluster is referred to as a slave DUE. The slave DUE does not have a connection link with the cellular base station, or performs limited communication with the cellular base station, for example, the slave DUE is in a LTE-DETACHED state. Compared with a case that all UEs maintain the link connection with the base station, an interaction signaling is decreased greatly in a case that the slave DUE is not connected to the base station or performs the limited communication with the base station. The communication mode is not only suitable for a future communication scenario of high speed and dense cell deployment, but also suitable for a scenario of the field of public safety. However, a specific function of the cluster head and an operation required in the D2D communication and a corresponding operation of the slave DUE needs to be further planed and designed.

SUMMARY

This part provides a general overview of the present disclosure, and is not overall disclosure for a full scope or all features of the present disclosure.

An objective of the present disclosure is to provide an electronic device on a user equipment side in a wireless communication system and a wireless communication method in the wireless communication system, to make clear and enhance an assisting role of a cluster head and therefore solve at least one of the technical problems mentioned above.

An electronic device on a user equipment side in a wireless communication system is provided according to an aspect of the present disclosure, the electronic device circuitry configured to perform device-to-device D2D communication under a cellular communication protocol with multiple user equipments, to directly transmit data information and/or control information with the multiple user equipments; and configure, for a first user equipment and a second user equipment of the multiple user equipments, resources and a Modulation and Coding Scheme MCS for performing the D2D communication between the first user equipment and the second user equipment, the second user equipment being a candidate object with which the first user equipment performs the D2D communication, where the communication unit transmits information indicating the resources and the MCS to the first user equipment and the second user equipment.

An electronic device on a user equipment side in a wireless communication system is provided according to another aspect of the present disclosure, the electronic device includes circuitry configured to receive information indicating resources and a Modulation and Coding Scheme MCS for performing D2D communication under a cellular communication protocol between the electronic device and a second user equipment from a first user equipment; and modulate and code data to be transmitted based on the MCS information, where the communication unit further transmits the modulated and coded data to be transmitted to the second user equipment through the resources, to perform the D2D communication.

An electronic device on a user equipment side in a wireless communication system is provided according to another aspect of the present disclosure, the electronic device includes circuitry configured to measure a base station equipment included in a potential cell list; and predict a target base station equipment for a user equipment in a user equipment cluster which performs device-to-device D2D communication based on a measurement result.

A wireless communication method in a wireless communication system is provided according to another aspect of the present disclosure, the wireless communication method includes: performing, by an electronic device on a user equipment side in the wireless communication system, device-to-device D2D communication under a cellular communication protocol with multiple user equipments, to directly transmit data information and/or control information with the multiple user equipments, configuring, for a first user equipment and a second user equipment of the multiple user equipments, resources and a Modulation and Coding Scheme MCS for performing the D2D communication between the first user equipment and the second user equipment, the second user equipment being a candidate object with which the first user equipment performs the D2D communication, where information indicating the resources and the MCS is transmitted to the first user equipment and the second user equipment.

A wireless communication method in a wireless communication system is provided according to another aspect of the present disclosure, the wireless communication method includes: receiving from a first user equipment, by an electronic device on a user equipment side in the wireless communication system, information indicating resources and a Modulation and Coding Scheme MCS for performing D2D communication under a cellular communication protocol between the electronic device and a second user equipment; modulating and coding data to be transmitted based on the MCS information; and transmitting the modulated and coded data to be transmitted to the second user equipment through the resources, to perform the D2D communication.

A wireless communication method in a wireless communication system is provided according to another aspect of the present disclosure, the wireless communication method includes: measuring, by an electronic device on a user equipment side in the wireless communication system, a base station equipment included in a potential cell list; and predicting a target base station equipment for a user equipment in a user equipment cluster which performs device-to-device D2D communication based on a measurement result.

The electronic device on the user equipment in the wireless communication system and the wireless communication method in the wireless communication system according to the present disclosure make clear and enhance the assisting role of a cluster head. In some particular scenarios, for example, for a slave DUE which does not have a LTE (Long Term Evolution) link with a traditional cellular network in a process of D2D communication, the assisting role of the cluster head can improve a switch speed and reduce signaling overhead in a case that the slave DUE is switched to a traditional cellular communication mode from a D2D communication mode. In addition, for example in a D2D broadcasting or multicasting communication scenario, the assisting role of the cluster head can assist a switch flow from the D2D broadcasting or multicasting mode to a unicasting communication mode.

A further applicability region becomes obvious from a description provided here. The description for the overview and a particular example are only schematic, and are not intended to limit the scope of the present disclosure.

BRIEF DESCRIPTION OF THE DRAWINGS

The drawings described here only schematically show the selected embodiments instead of all possible embodiments, and are not intended to limit the scope of the present disclosure.

Figure 1:
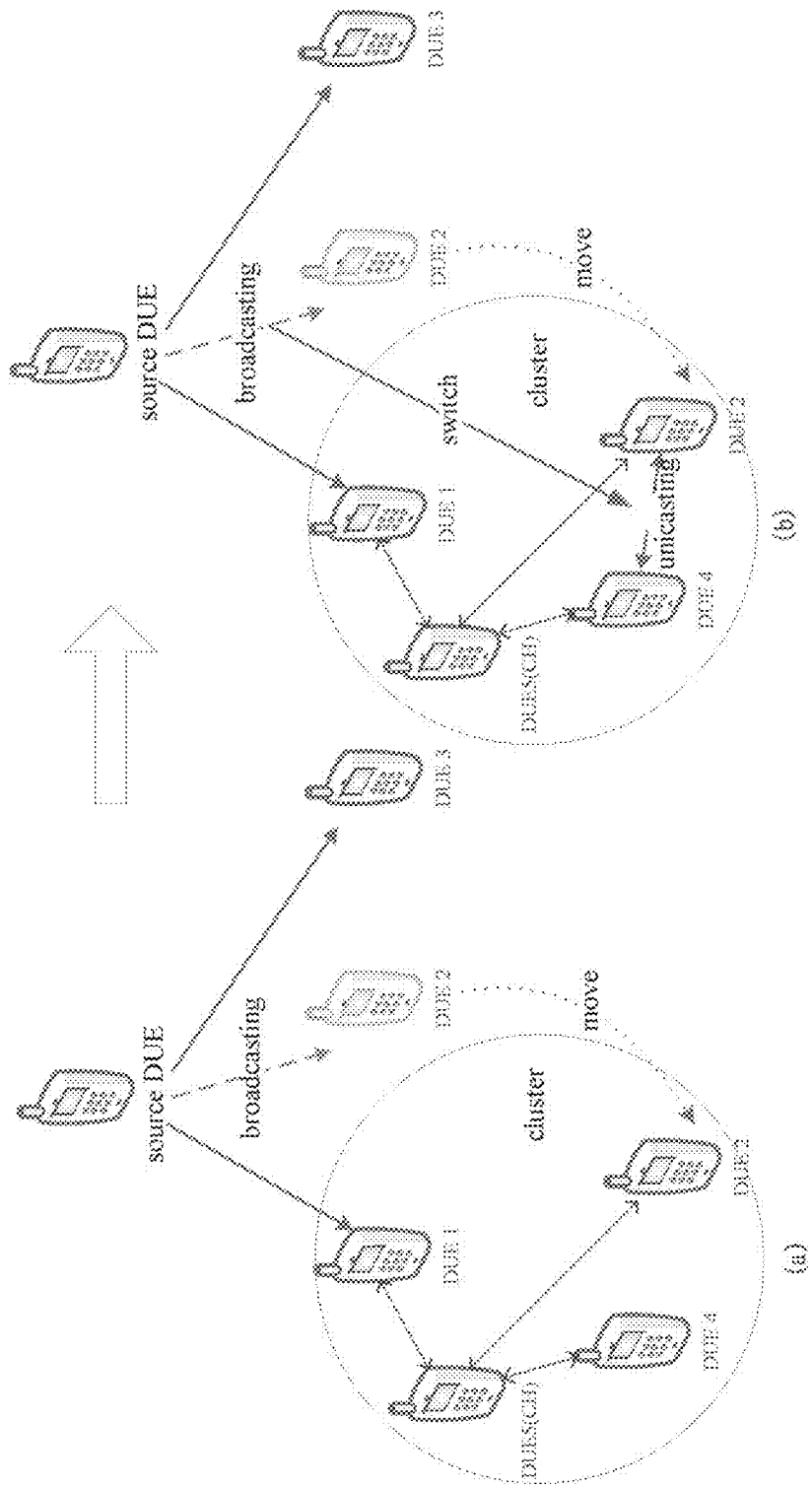
FIG. 1 is a schematic diagram for showing a scenario of switching from a D2D broadcasting mode to a D2D unicasting mode according to an embodiment of the present disclosure.

Although it is easy to make various modifications and substitutions onto the present disclosure, particular embodiments, as an example, have been shown in the drawings, and are described in detail here. However, it should be understood that a description for the particular embodiments is not intended to limit the present disclosure within a disclosed way, an objective of the present disclosure is to include all modifications, equivalents and substitutions within the principle and scope of the present disclosure. It should be noted that a label indicates a component corresponding to the label through the drawings.

DETAILED DESCRIPTION OF THE EMBODIMENTS

An example of the present disclosure is described fully now with reference to the drawings. The description below is only exemplary substantially, and is not intended to limit the present disclosure, an application or a purpose.

Exemplary embodiments are provided to fully detail the present disclosure and convey the scope of the present disclosure to those skilled in the art. Several particular details such as an example of a particular component, device and method are described, to fully understand the embodiments of the present disclosure. It is clear for those skilled in the art that, the exemplary embodiments can be implemented in multiple different ways without using particular details, and the exemplary embodiments are not intended to limit the scope of the present disclosure. A well-known process, a well-known structure and a well-known technology are not described in detail in some exemplary embodiments.

The present disclosure relates to D2D (Device-to-Device) communication in the wireless communication network. A UE (User Equipment) in the present disclosure includes but not limited to a terminal, having a function of wireless communication, such as a mobile terminal, a computer or an on-board device. In addition, the UE in the present disclosure may also be the UE itself or a component such as a chip in the UE. Furthermore, a base station in the present disclosure may for example be an eNodeB or a component such as a chip in the eNodeB.

FIG. 1 shows a scenario of switching from a D2D broadcasting mode to a D2D unicasting mode according to an embodiment of the present disclosure.

As shown in FIG. 1, in a D2D broadcasting group, a source DUE (D2D User Equipment) broadcasts information to other DUEs (i.e. DUE1, DUE2 and DUE3). In a case that a broadcasting link of DUE2 gets worse (for example, DUE2 moves to a position far away from the source DUE) and therefore information transmission quality can not be ensured. DUE2 is required to be switched to other communication mode from a current D2D broadcasting mode. In a case that a DUE is switched to a traditional cellular mode from the D2D broadcasting mode, a base communication requirement (the DUE can perform continuous communication with the source DUE via the base station or the DUE can perform communication with other DUE close to the DUE via the base station) of the DUE can be ensured. However, this switch process will result in large signaling overhead. The inventor in the present disclosure considers that the base communication requirement can also be met in a case that DUE2 is switched to a unicasting communication mode with other DUE from the D2D broadcasting mode. For example, in a case that DUE2 still needs to acquire broadcasting information transmitted by the source DUE, DUE2 can be switched to perform unicasting communication with DUE1 which has acquired the broadcasting information, so as to receive the broadcasting information. Alternatively, in a case that a high-layer application of DUE2 no longer concerns the broadcasting information, DUE2 can be switched to perform unicasting communication with other DUE such as DUE4 purposefully. A switch time and a signaling are decreased quite much compared with a case of switching to the traditional cellular mode.

In a scenario shown in FIG. 1, DUE1, DUE2, DUE4 and DUE5 are constructed into a DUE cluster. In the DUE cluster, DUE5 is a CH (Cluster Head). The cluster head in the present disclosure is a DUE within the cluster which maintains a link with a network side, and can assist members in the cluster in performing D2D communication mode switch.

There is a broadcasting source DUE in FIG. 1, which is a DUE for transmitting a broadcasting message in D2D broadcasting communication. Other DUEs such as DUE1, DUE2 and DUE3 are DUEs for receiving the broadcasting message in the D2D broadcasting communication. In addition, DUE such as DUE4 shown in (b) of FIG. 1 may be referred to as a new target DUE, which is a communication object with which DUE such as DUE2 establishes D2D unicasting communication.

The scenario in FIG. 1 is only exemplary, and the present disclosure is not limited thereto. For example, the source DUE and the cluster head may be a same UE. In addition, the scenario in FIG. 1 may further include a base station such as an eNB (evolution Node Base Station) (not shown), the base station is a service cell where the DUE (for example, DUE2) and the cluster head are located, may be a service cell of the new target DUE, or may not be the service cell of the new target DUE, that is, the new target DUE may be located in an adjacent cell of the DUE (for example, DUE2).

According to the embodiment of the present disclosure, for a cluster user such as DUE2 in a D2D broadcasting cluster which is performing D2D broadcasting communication, DUE2 can be switched to the D2D unicasting mode from the D2D broadcasting mode in a case that quality of a link between DUE2 and the source DUE which is performing the D2D broadcasting communication changes, that is, the quality of the link is reduced, to ensure completeness and continuousness of receiving the information. Meanwhile, since that the user in the broadcasting cluster receives information from a same source DUE, the user in the broadcasting cluster acquires same information theoretically without considering a problem such as information loss. Therefore, target information which is desired to be acquired by the user in the broadcasting cluster performing transmission mode switch may be changed or may not be changed, that is, the user in the broadcasting cluster can be switched to perform unicasting communication with any one user in the broadcasting cluster.

Figure 2:
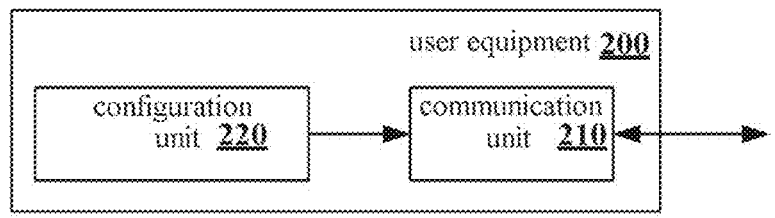
FIG. 2 is a block diagram for showing a structure of a user equipment according to an embodiment of the present disclosure.

FIG. 2 shows a structure of a UE 200 according to an embodiment of the present disclosure. In the embodiment, UE 200 may be served as a cluster head, such as DUE5 in FIG. 1. As shown in FIG. 2, UE 200 may include a communication unit 210 and a configuration unit 220. UE 200 may be realized as a mobile terminal (such as a smart phone, a panel personal computer (PC), a notebook computer, a portable game terminal, a portable/dongle mobile router and a digital camera device) or an on-board terminal (such as a car navigation device). UE 200 can be realized as a terminal (also referred to as a machine-type-communication (MTC) terminal) which performs machine-to-machine (M2M) communication. In addition, UE 200 may be a wireless communication module (such as an integrated circuit module including a single wafer) installed on each terminal of the terminals described above.

According to an embodiment of the present disclosure, UE200 can include a processing circuitry. Further, the processing circuitry can include various independent functional units to perform various and different functions and/or operations. It is described that these functional units can be physical entities or logical entities, and the units in different appellations may be implemented by a same physical entity. Further, UE200 can include one processing circuitry, also can include multiple processing circuitries. In addition, UE200 can further include a communication unit as a transceiver.

The communication unit 210 may perform D2D communication under a cellular communication protocol with multiple UEs (for example, DUE1, DUE2 and DUE4 shown in FIG. 1), so as to directly transmit data information and/or control information to the multiple UEs. The cellular communication protocol may be for example LTE-A (Long Term Evolution advanced), LTE-U and so on, which is not limited in the present disclosure.

The configuration unit 220 may configure, for a first UE such as DUE2 in FIG. 1 and a second UE such as DUE 4 in FIG. 1 of the multiple UEs, resources and a MCS (Modulation and Coding Scheme) for performing D2D communication between the DUE2 and DUE4. DUE4 is a candidate object with which DUE2 performs the D2D communication.

The communication unit 210 may transmit information indicating the resources and the MCS to DUE2 and DUE4.

It should be illustrated that, in a case that the D2D communication has a default dedicated MCS in an example of the present disclosure, the configuration unit 220 may not configure the MCS.

Specifically, the indicated resources are for example physical resource blocks (PRB), the MCS information is for example five-bit $I_{MCS}$ (an MCS index value) having a value range from 0 to 31. Each $I_{MCS}$ corresponds to a modulation mode (for example, QPSK, 16QAM, 64QAM), and the modulation mode can also be represented by a modulation order. $I_{MCS}$ may also correspond to a transport block size (TBS). In addition, $I_{MCS}$ may also correspond to a redundancy version in some examples. Specifically, correspondences between a MCS index value and a modulation order, between a MCS index value and a transport block size and between a MCS index value and a redundancy version may be represented in a format of table and may be stored in a chip of the DUE in advance. In an specific example, the table of the correspondences between a MCS index value for the D2D communication and a modulation order, between a MCS index value for the D2D communication and a transport block size and between a MCS index value for the D2D communication and a redundancy version is the same as a table for PUSCH defined in the current standard. In another example, a value range of the MCS index value for the D2D communication is a subset of the value range from 0 to 31, for example, from 10 to 20, thereby reducing complexity of modulation and coding between DUEs.

It should also be illustrated that each of the units related in the specification and the appended claims may be a physical entity or a logical entity, units having different names may be realized by a same physical unit. For example, a first transmitting unit and a second transmitting unit mentioned subsequently in the specification may be realized by a same physical unit for example an antenna, a filter or a modulator-demodulator.

According to the embodiment of the present disclosure, UE 200 served as the cluster head DUE5 may configure the resources (and optionally the MCS) for performing the D2D communication for DUE2 and DUE4 in the cluster, thereby assisting in successfully switching to a unicasting communication mode from a D2D broadcasting or multicasting mode, or further assisting in a switch flow of switching from a D2D unitcasting communication object to another D2D unitcasting communication object.

According to the embodiment of the present disclosure, the communication unit 210 may further receive indication information indicating quality of a link between DUE2 and DUE4 from DUE2, for example, a measurement result obtained by measuring by DUE2. In another example, the cluster head UE 200 may measure for DUE2, and acquire an index of quality of a link between DUE2 and other DUE such as DUE4. In a case that the quality of the link indicated by the indication information meets a predetermined condition, the configuration unit 210 may configure the resources and the MCS for performing the D2D communication between DUE2 and DUE4. In other words, the configuration unit 210 configures the resources and the MCS in consideration of the quality of the link between DUE2 and DUE4, that is, quality of a channel and a radio condition. In addition, the configuration unit 210 may consider the resources and the MCS configuration based on at least one of a QoS requirement, a buffer status and an interference condition of a current service received from DUE2. In this way, the switch flow is performed successfully.

For example, in a case that UE 200 served as the cluster head DUE5 is located within a service scope of a base station, the communication unit can transmit switch request information indicating that DUE2 is to perform D2D communication with DUE4 to the base station equipment, and receive switch request acknowledge information from the base station equipment. For example, UE 200 determines whether the quality of the link between DUE2 and DUE4 meets the predetermined condition, and UE 200 transmits switch request information to the base station equipment in a case that the quality of the link meets the predetermined condition, to reduce system overhead. Here, the switch request information may include at least one of a QoS requirement, a buffer status and an interference condition of a current service of DUE2 received from DUE2, the switch request acknowledge information may include resource allocation information for the D2D communication between DUE2 and DUE4. In this case, the configuration unit 220 may configure the resources and the MCS at least based on the switch request acknowledge information. In an example, UE 200 transmits a high-layer signaling such as a RRC message including the switch request information to the base station equipment. Correspondingly, the base station equipment feedbacks a RRC message including the resource allocation information for the D2D communication between DUE2 and DUE4 to UE 200. UE 200 parses the RRC message in a high layer to extract the resource allocation information for the D2D communication between DUE2 and DUE4. Specifically, a scheduler in the base station equipment determines resources allocation based on at least one of the quality of the link between DUE2 and DUE4, the QoS requirement of the service, the buffer status and the interference condition. As an example, the scheduler for the D2D communication is arranged in the base station equipment dedicatedly, to allocate resources to a D2D user in a semi-static way.

In another aspect, for example, in a case that UE 200 served as the cluster head DUE5 is located outside of the service scope of the base station, the configuration unit 220 may select a resource from a predetermined D2D communication resource pool to configure. Specifically, in an example, the predetermined D2D communication resource pool is information stored in advance in a chip of a user equipment which supports the D2D communication, for example, a resource in a specific spectrum. In another example, in a case that UE 200 served as the cluster head DUE5 is located within the service scope of the base station, the predetermined D2D communication resource pool is specified by the base station equipment in advance, for example, the predetermined D2D communication resource pool is specified through a RRC message, and UE 200 can update information in the resource pool by a RRC message transmitted by the base station again. In this example, UE 200 can allocate the resources for the D2D user without the assistance of the base station equipment. In a case that the cluster head UE 200 also receives a D2D communication requirement between other DUEs managed by UE 200, the configuration unit 220 operates as a scheduler, the scheduler operates for example in a RRC layer or a MAC layer, and determines a communication resource for the other DUEs based on at least one of the quality of a link between the other DUEs, a QoS requirement of a service, a buffer status and an interference condition.

According to the embodiment of the present disclosure, the communication unit 210 may further receive indication information indicating quality of a link between DUE 2 and a third UE such as the source DUE in FIG. 1 from DUE2. Except that it is assumed that DUE 2 is performing D2D broadcasting communication with the source DUE in advance, it is assumed that DUE2 is performing D2D unitcasting communication with the third UE in advance, which is not limited in the present disclosure. In any case, the predetermined condition mentioned above may at least include that the quality of the link between DUE2 and DUE4 is better than the quality of the link between DUE2 and the source DUE.

According to the embodiment of the present disclosure, the communication unit 210 may also receive information indicating the source DUE is a broadcasting information source for DUE2 and DUE4 from DUE2 and/or DUE4. At this time, in a case that the predetermined condition is met, the configuration unit 220 may determine that DUE2 performs the unitcasting D2D communication with DUE4, so that DUE2 continues to acquire broadcasting information from DUE4. Furthermore, the communication unit 210 may receive a transmission frame number status (SN STATUS) between DUE2 and the source DUE from DUE2, and transmit the transmission frame number status to DUE4, so that DUE2 continues to receive broadcasting information of the source DUE from DUE4.

According to the embodiment of the present disclosure, the configuration unit 220 may be further configured to configure HARQ (Hybrid Automatic Repeat Request) for the D2D communication between DUE2 and DUE4. Specifically, the configuration unit 220 may for example configure a parameter such as a feedback frequency of HARQ, for example, it is defined that feedback is performed once for n transport blocks, where n is an integer greater than 1. In addition, the communication unit 210 may transmit HARQ configuration information to DUE2 and DUE4.

According to the embodiment of the present disclosure, the configuration unit 220 may further configure, for DUE2, D2D communication connection assistance information for accessing into DUE4. The D2D communication connection assistance information may include for example a RA preamble (Random Access preamble), a D2D RACH (Random Access Channel) resource and so on. Furthermore, the communication unit 210 may transmit the D2D communication connection assistance information to DUE2.

According to the embodiment of the present disclosure, the communication unit 210 may transmit information indicating the resources and the MCS to DUE2 and DUE4 through a RRC (Radio Resource Control) signaling.

Figure 3:
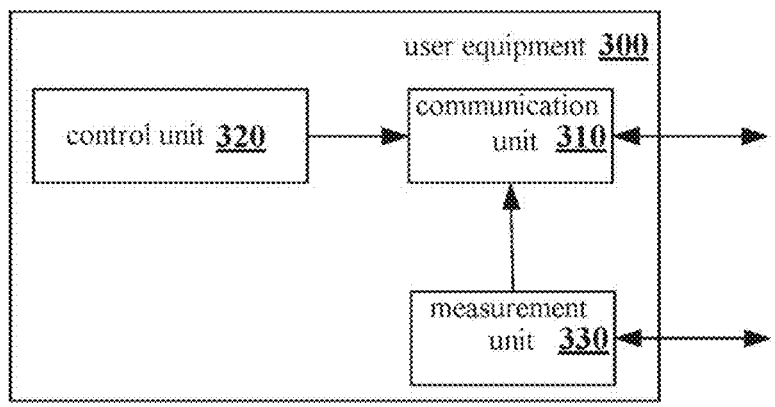
FIG. 3 is a block diagram for showing a structure of a user equipment according to another embodiment of the present disclosure.

The structure of UE 200 served as the cluster head DUE 5 is described above in conjunction with FIG. 2. A structure of a UE served as an ordinary DUE within the cluster according to the embodiment of the present disclosure is described below FIG. 3 shows a structure of UE 300 served as an ordinary DUE such as DUE2 in FIG. 1 within the cluster. As shown in FIG. 3, UE 300 may at least include a communication unit 310 and a control unit 320.

The communication unit 310 may receive information indicating resources and a MCU for performing D2D communication under a cellular communication protocol between UE 300 (such as DUE2 as shown in FIG. 1) and a second UE (such as DUE4 as shown in FIG. 1) from a first UE such as DUE5 (served as a cluster head) as shown in FIG. 1.

The control unit 320 may modulate and code data to be transmitted based on the MCS information.

Here, the communication unit 310 may transmit the modulated and coded data to be transmitted to DUE4 by the resources, so as to perform the D2D communication.

As shown in FIG. 3, UE 300 may further include a measurement unit 330. The measurement unit 330 may measure quality of a link between UE 300 (such as DUE2 as shown in FIG. 1) and DUE4. In addition, the communication unit 310 may transmit indication information on the quality of the link to DUE5 served as the cluster head.

According to the embodiment of the present disclosure, UE 300 (such as DUE2 as shown in FIG. 1) can perform D2D communication with a third UE (such as the source DUE as shown in FIG. 1) before performing the D2D communication with DUE4. In this case, the measurement unit 330 may measure quality of a link between UE 300 (such as DUE2 as shown in FIG. 2) and the source DUE. Furthermore, the communication unit 310 may transmit indication information on the quality of the link to DUE5 served as the cluster head.

According to the embodiment of the present disclosure, the communication unit 310 may also receive, from DUE5 served as the cluster head, at least one of measurement configuration information for measuring quality of a link between UE 300 (such as DUE 2 as shown in FIG. 1) and DUE4; HARQ configuration information for the D2D communication between UE 300 (such as DUE 2 as shown in FIG. 1) and DUE4; and D2D communication connection assistance information for accessing into DUE4.

According to the embodiment of the present disclosure, the communication unit 310 may transmit a D2D RA preamble to DUE4 through D2D RACH based on the assistance information, so as to access into DUE4, and may receive an access response from DUE4. Here, the access response may include at least one of timing advance and scheduling arrangement for data to be transmitted. In this example, a scheduler may be arranged in DUE4, and the scheduler performs resource scheduling for each transmission based on the resources and the MCS configured by the cluster head, for example, the scheduler in DUE4 may specify which resource block will carry data to be transmitted in a case that the resources configured by the cluster head are several time-frequency resource block.

According to the embodiment of the present disclosure, the communication unit 310 may transmit acknowledge information indicating that the D2D communication with DUE 4 has been established successfully to DUE5 severed as the cluster head after receiving the access response, and stops receiving information from the source DUE.

According to the embodiment of the present disclosure, the communication unit 310 may receive broadcasting information from the source DUE through a D2D broadcasting link, and transmit a transmission frame number status for UE 300 (such as DUE2 shown in FIG. 1) and the source DUE to DUE 5 served as the cluster head. DUE 2 establishes unicasting D2D communication with DUE4 with the assistance of DUE5, and continues to receive broadcasting information from DUE4. It should be noted that, DUE 2 does not transmit the transmission frame number status for the source DUE to DUE5 in a case of no concerning the broadcasting information, and correspondingly, the cluster head DUE 5 does not notify the target DUE 4 of information on the transmission frame number.

Figure 4:
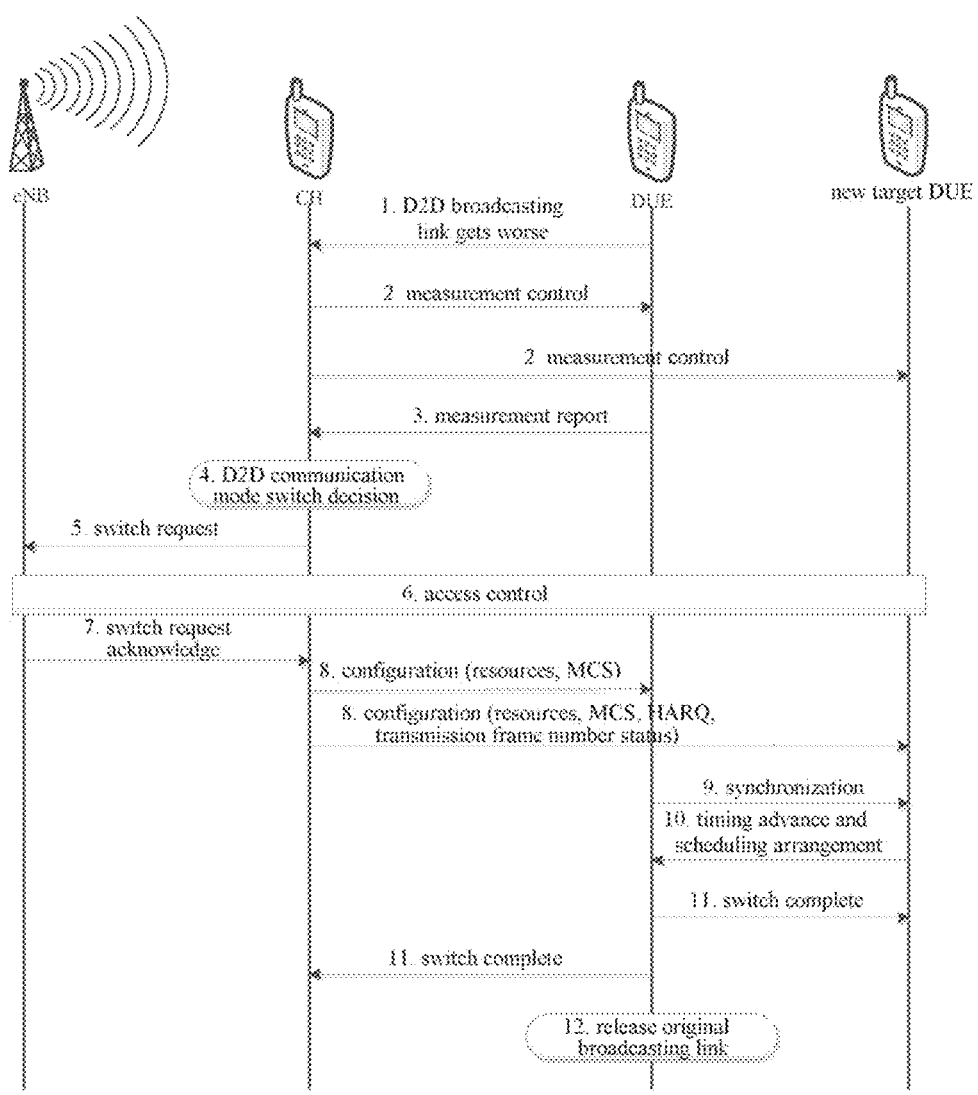
FIG. 4 is a sequence diagram for showing a method for performing communication mode switch in a wireless communication system according to an embodiment of the present disclosure.
Figure 5:
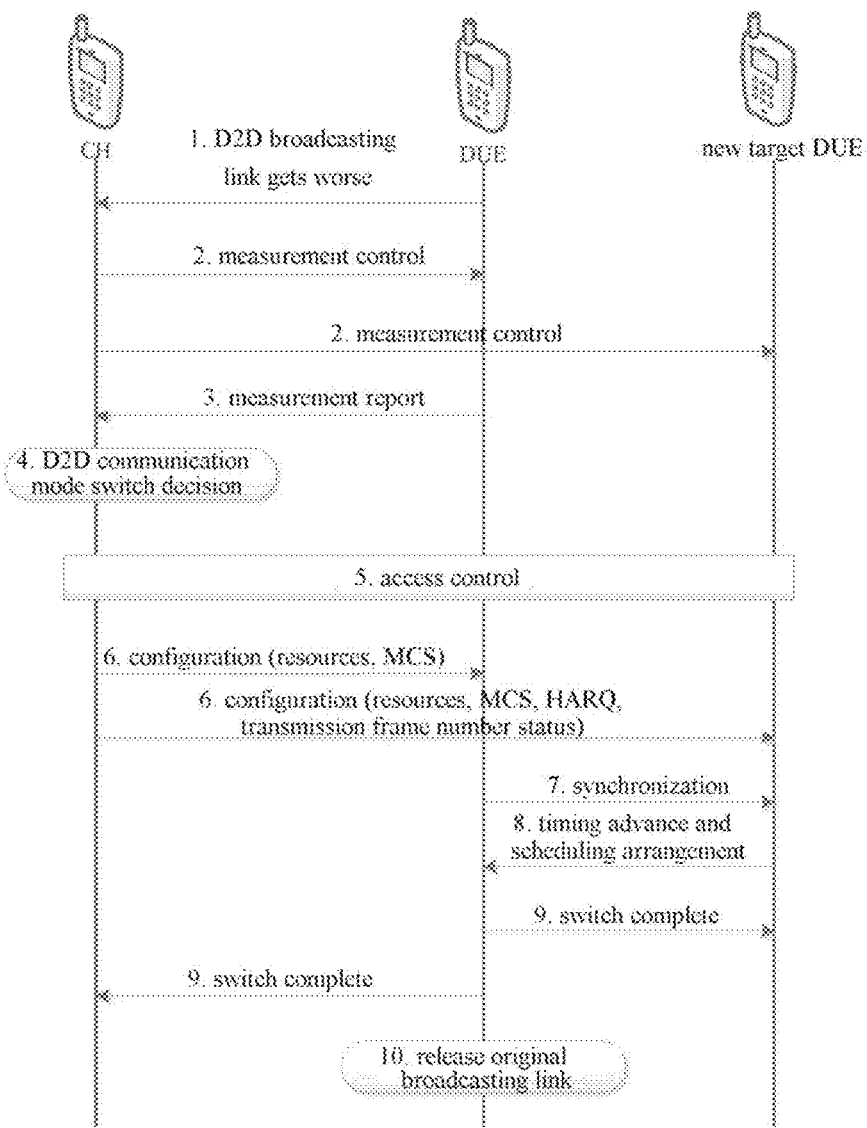
FIG. 5 is a sequence diagram for showing a method for performing communication mode switch in a wireless communication system according to another embodiment of the present disclosure.

A communication switch process in a wireless communication system according to an embodiment of the present disclosure is described below in conjunction with FIG. 4 and FIG. 5. FIG. 4 shows a switch flow from D2D broadcasting to D2D unicasting within a coverage scope of a base station equipment according to an embodiment of the present disclosure, and FIG. 5 shows a switch flow from D2D broadcasting to D2D unicasting outside of the coverage scope of the base station equipment according to an embodiment of the present disclosure.

In a scenario of switching from a D2D broadcasting communication mode to a D2D unicasting communication mode within a coverage scope of a traditional cellular network, a main flow is described as follows.

1. In a case that a DUE which is performing D2D broadcasting communication detects that quality of a broadcasting link of the DUE gets worse, the DUE notifies a cluster head (CH) of a message that the quality of the broadcasting link gets worse, and the cluster head transmits measurement configuration information to the DUE and a new target DUE.

2. The DUE transmits a measurement report to the cluster head after measuring by using the measurement configuration information, and the cluster head makes a decision on switching D2D communication mode based on the measurement report, and transmits a switch request to an eNB (evolution Node Base Station).

3. The eNB allocates resources to the DUE and the new target DUE, and transmits necessary information to the cluster head, to determine to switch.

4. The cluster head transmits required configuration information to the DUE and the new target DUE, and assists the DUE in establishing D2D unicasting communication with the new target DUE.

Specifically, as shown in FIG. 4, in step 1, the DUE transmits information to the cluster head in a case of detecting that quality of a D2D broadcasting link gets worse.

In step 2, the cluster head transmits configuration information to the DUE to perform corresponding measurement, and the cluster head configures a new target DUE to transmit a reference signal to be measured by the DUE, the configuration information includes for example physical resource information for transmitting/receiving the reference signal.

In step 3, the DUE performs the corresponding measurement and then transmits a measurement report to the cluster head.

In step 4, the cluster head (CH) makes a switch decision based on the measurement report transmitted by the DUE and wireless resource management within the cluster.

In step 5, the cluster head transmits a SWITCH REQUEST message to the eNB, the SWITCH REQUEST message carries necessary information for performing the D2D unicasting communication by the DUE. The necessary information may include for example, an ID of the DUE, an ID of the new target DUE and radio access bearer context (E-RAB context) which mainly includes necessary addressing information for a radio network layer (RNL) and a transmission network layer (TNL) and a Qos configuration file of radio access bearer.

In step 6, the eNB performs access control. Specifically, the eNB determines whether resources required by communication can be ensured based on the Qos information of radio access bearer transmitted by the CH. Then, the eNB allocates resources dynamically based on the Qos requirement. In addition, in a case that the new target DUE belongs to an adjacent cell, the eNB interacts with a service base station of the new target DUE via an X2 interface, to discuss the issue of resource allocation.

In step 7, the eNB prepares for switching and transmits a SWITCH REQUEST ACKNOWLEDGE message to the CH, the SWITCH REQUEST ACKNOWLEDGE message carries information required by switching the D2D communication mode by the DUE. The SWITCH REQUEST ACKNOWLEDGE message mainly includes resource allocation assurance, a default D2D RACH preamble for establishing a random connection between the DUE and the new target DUE and other parameters such as an access parameter of D2D unicasting.

In step 8, the cluster head configures and then transmits configuration information to the DUE and the new target DUE. Specifically, the cluster head may generate RRCConnectionReconfiguration message including a mobilityControlInformation message. The RRCConnectionReconfiguration message mainly includes resource allocation, a modulation and coding scheme (MCS), a HARQ of D2D unicasting, an SN STATUS TRANSFER message which is a frame number reception status transmitted to a PDCP layer of the new target DUE.

It should be noted that the HARQ is also supported in the D2D broadcasting communication in some examples, a time resource is contacted by a HARQ entity, to perform blind integration on HARQ transmission (retransmission). Therefore, the HARQ is reconfigured in a case of switching the D2D communication from the broadcasting mode to the unicasting mode, to meet a communication requirement.

In step 9, the DUE accesses into the new target DUE based on the RRCConnectionReconfiguration message (including the mobilityControlInformation message) transmitted by the cluster head in a way of D2D random access, and acquires synchronization from the DUE to the new target DUE.

In step 10, the new target DUE transmits an access response to the DUE. The access response may include scheduling arrangement (SA) for indicating when, where and how the new target DUE transmits D2D information to the DUE and timing advance (TA).

In step 11, the DUE transmits RRCConnectionReconfigurationComplete messages to the CH and the new target DUE respectively after successfully accessing into the new target DUE, to confirm that the D2D communication mode is switched. In this case, the new target DUE checks the received RRCConnectionReconfigurationComplete message, and then transmits data to the DUE.

In step 12, the DUE releases resources related the D2D broadcasting communication, and therefore, the switch flow is ended.

In another aspect, in a scenario of switching from a D2D broadcasting communication mode to a D2D unicasting communication mode outside of a coverage scope of a traditional cellular network, a main flow is described as follows.

1. In a case that a DUE which is performing D2D broadcasting communication detects that quality of a broadcasting link of the DUE gets worse, the DUE notifies a cluster head (CH) of a message that the quality of the broadcasting link gets worse, and the cluster head transmits measurement configuration information to the DUE and a new target DUE.

2. The CH makes a decision on switching the communication mode based on a measurement report of the DUE, and performs resource allocation on the DUE and the new target DUE in a resource pool based on pre-configuration.

3. The DUE realizes switch from the D2D broadcasting communication to unicasting communication with the new target DUE based on acquired configuration information.

Specifically, as shown in FIG. 5, in step 1, the DUE transmits information to the cluster head in a case of detecting that quality of a D2D broadcasting link gets worse.

In step 2, the cluster head performs measurement control. Specifically, the cluster head transmits configuration information to the DUE to perform a corresponding measurement. Furthermore, the cluster head configures a new target DUE to transmit a reference signal to be measured by the DUE.

In step 3, the DUE performs the corresponding measurement and transmits a measurement report to the cluster head.

In step 4, the cluster head (CH) makes a switch decision based on the measurement report transmitted by the DUE and wireless resource management within the cluster.

In step 5, the cluster head performs access control. Specifically, the CH determines whether resources required by the communication can be ensured in a pre-configured resource pool based on received Qos information of radio bearer. Then, the CH allocates resources based on the Qos requirement and the pre-configured resource pool.

In step 6, the cluster head configures the DUE and the new target DUE. Specifically, the cluster head generates RRCConnectionReconfiguration message including a mobilityControlInformation message. The RRCConnectionReconfiguration message mainly includes resource allocation, a modulation and coding scheme (MCS), HARQ of D2D unicasting, an SN STATUS TRANSFER message which is a frame number connection status transmitted to a PDCP layer of the new target DUE.

It should be noted that the HARQ is also supported in the D2D broadcasting communication, a time resource is contacted by a HARQ entity, to perform blind integration on HARQ transmission (retransmission). The HARQ is reconfigured in a case of switching the D2D communication from the broadcasting mode to the unicasting mode, to meet a communication requirement.

In step 7, the DUE accesses into the new target DUE based on the RRCConnectionReconfiguration message (including the mobilityControlInformation message) transmitted by the cluster head in a way of D2D random access, and acquires synchronization from the DUE to the new target DUE.

In step 8, the new target DUE transmits an access response to the DUE. The access response may include scheduling arrangement (SA) for indicating when, where and how the new target DUE transmits D2D information to the DUE and timing advance (TA).

In step 9, the DUE transmits RRCConnectionReconfigurationComplete messages to the CH and the new target DUE respectively after successfully accessing into the new target DUE, to confirm that the D2D communication mode is switched. In this case, the new target DUE checks the received RRCConnectionReconfigurationComplete message, and then transmits data to the DUE.

In step 10, the DUE releases resources related the D2D broadcasting communication, and therefore, the switch flow is ended.

The scenario of switching from the D2D broadcasting communication mode to the D2D unicasting communication mode is described above. A scenario of switching from a short-distance D2D communication mode to a traditional cellular communication mode is described below.

Figure 6:
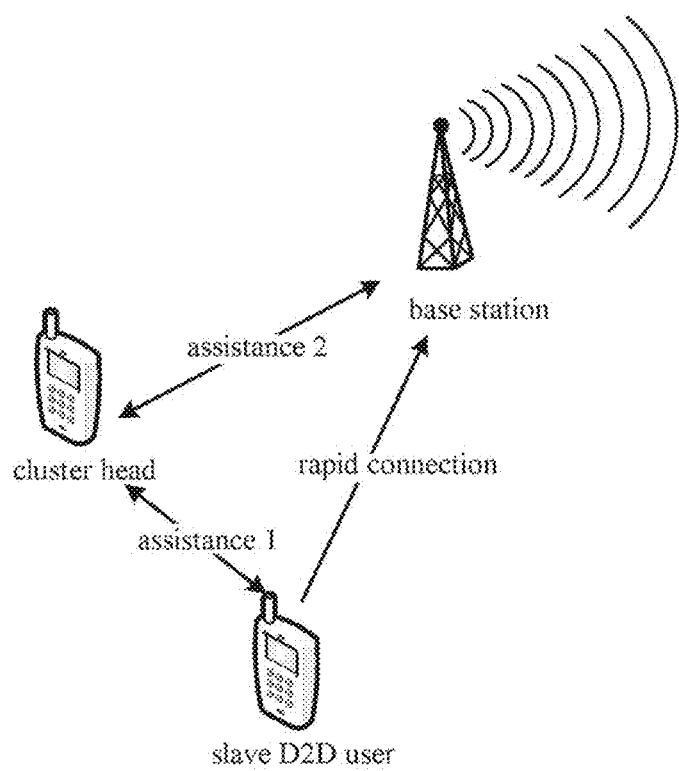
FIG. 6 is a schematic diagram for showing a switch scenario from a D2D communication mode to a cellular communication mode known by the inventor.

FIG. 6 shows a scenario of switching from a D2D communication mode to a cellular communication mode. As shown in FIG. 6, a slave D2D user (a slave DUE) is in the D2D communication mode, and is in an LTE-DETACH state. In a case that a whole cluster has a strong mobility (such as in a scenario of high-speed rail), signaling overhead is large in a case that the slave DUE maintains a link with a base station. In a case that the slave DUE is in the LTE-DETACH state and only maintains a control link with a cluster head, unnecessary signaling overhead can be omitted.

In the embodiment, the slave DUE refers to a UE within a short-distance D2D communication cluster which does not maintain a cellular link with a service base station of the slave DUE. The cluster head refers to a UE within the short-distance D2D communication cluster which maintains a cellular link with the service base station of the cluster head. In addition, a target base station refers to a target base station to be connected to the slave DUE in a switching process.

In a traditional switch flow without the assistance of the cluster head known by the inventor of the present disclosure, the slave DUE will take a long time period to perform cell search and cell selection, and therefore signaling overhead between the network and the UE is large.

In order to solve the problem in the traditional switch flow that the signaling overhead between the network and the UE is large, an electronic device on a UE side in a wireless communication system is provided in the present disclosure, which can enhance an assisting role of the cluster head, thereby reducing the signaling overhead between the network and the slave DUE.

Figure 7:
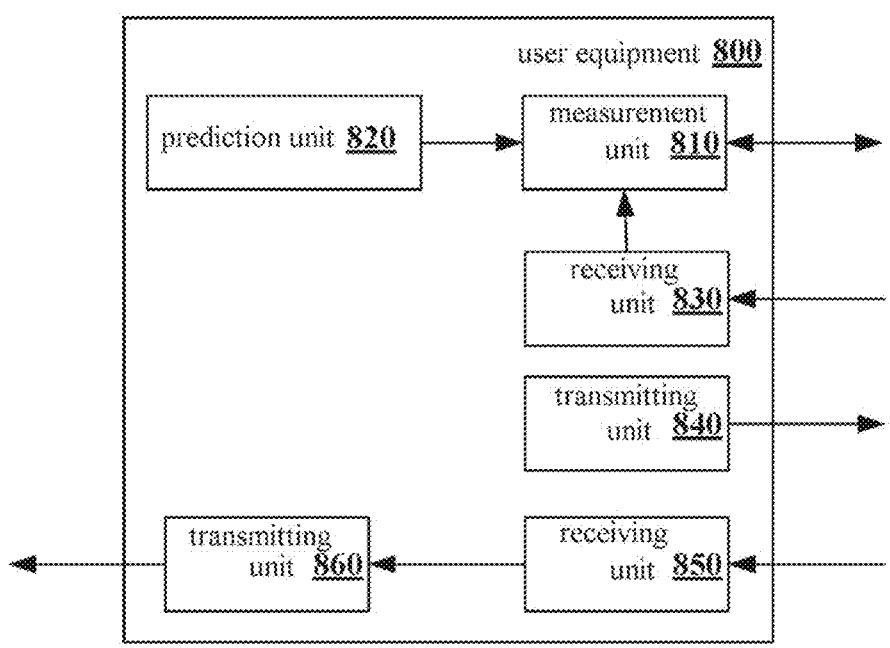
FIG. 7 is a block diagram for showing a structure of a user equipment according to another embodiment of the present disclosure.

FIG. 7 shows a structure of a UE 800 according to another embodiment of the present disclosure. UE 800 may be served as a cluster head as shown in FIG. 6. As shown in FIG. 7, UE 800) may at least include a measurement unit 810 and a prediction unit 820.

The measurement unit 810 may measure a base station equipment included in a potential cell list. A potential target cell of a slave DUE is stored in the potential cell list (PotentialCellList), the potential cell list may include a source base station of the cluster head, a cell stored in the slave DUE, a cell stored in the cluster head and an adjacent cell.

The prediction unit 820 may, predict, based on a measurement result of the measurement unit 810, a target base station equipment for the salve DUE in a UE cluster which performs D2D communication.

According to the embodiment of the present disclosure, since that the assisting role of the cluster head is enhanced, the signaling overhead between the network and the slave DUE can be reduced.

As shown in FIG. 7, UE 800 may further include a receiving unit 830 as a first receiving unit. The receiving unit 830 may receive switch request information indicating switching from a D2D communication mode to a traditional cellular communication mode from the slave DUE. The switch request information may include information on the potential cell list.

Furthermore, as shown in FIG. 7, UE 800 may further include a transmitting unit 840 as a first transmitting unit, a receiving unit 850 as a second receiving unit and a transmitting unit 860 as a second transmitting unit.

The transmitting unit 840 may transmit random access preamble information to the target base station equipment.

Subsequently, the receiving unit 850 may receive random access response information from the target base station equipment.

The transmitting unit 860 may transmit switch response information to the slave DUE based on the random access response information.

According to the embodiment of the present disclosure, in a case that the random access response information indicates that access fails, the prediction unit 810 may predict a further target base station equipment from the remaining base station equipments included in the potential cell list, until access succeeds.

According to the embodiment of the present disclosure, in a case that the access fails for all of the base station equipments included in the potential cell list, the transmitting unit 860 can transmit information indicating performing traditional switching from the D2D communication mode to the traditional cellular communication mode to the slave DUE.

According to the embodiment of the present disclosure, in a case that the random access response information still indicates that access fails when a predetermined time elapses after the receiving unit 830 receives the switch request information, the transmitting unit 860 can transmit information indicating performing traditional switching from the D2D communication mode to the traditional cellular communication mode to the slave DUE.

Figure 8:
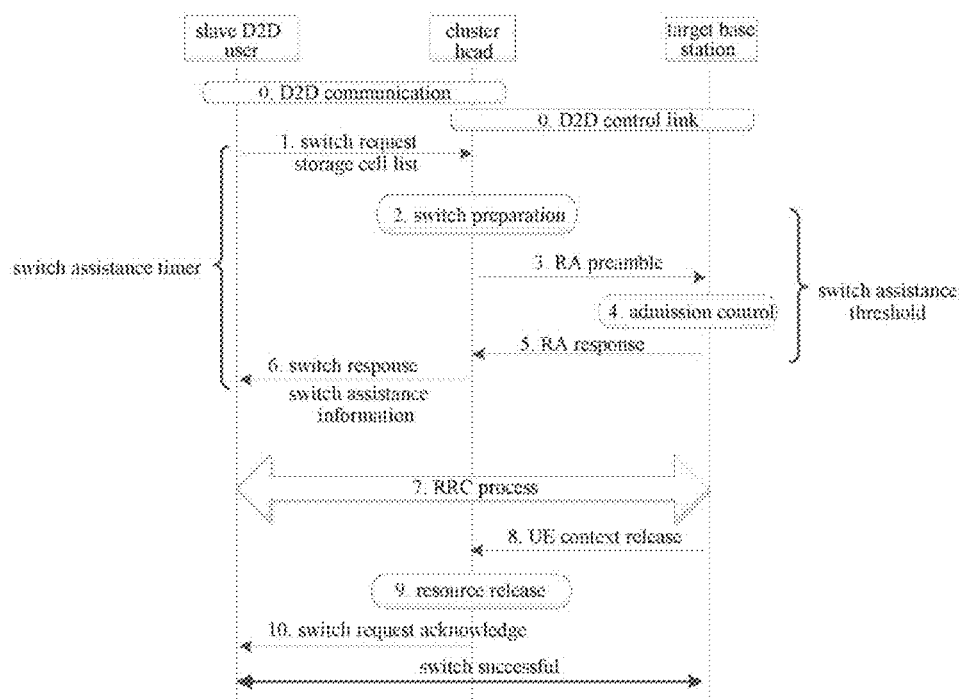
FIG. 8 is a sequence diagram for showing a method for performing communication mode switch in a wireless communication system according to another embodiment of the present disclosure.

A communication switching process in a wireless communication system according to another embodiment of the present disclosure is described below in conjunction with FIG. 8. FIG. 8 shows a flow of switching from a D2D communication mode to a traditional cellular communication mode with the assistance of a cluster head according to another embodiment of the present disclosure.

In a scenario of switching from the D2D communication mode to the traditional cellular communication mode with the assistance of the cluster head, a base flow is described as follows.

1. A slave DUE is connected to a target cell with the assistance of the cluster head, the cluster head can assist the slave DUE in rapidly realizing the switching by virtual random access.

2. In a case that random access is successful with the assistance of the cluster head, the cluster head can collect system information, and notify the slave DUE that the slave DUE can be connected with a target base station based on the system information transmitted by the target base station.

3. In a case that the assistance of the cluster head is unsuccessful randomly before a switch assistance timer overflows or within a switch assistance threshold, the slave DUE will trigger a traditional switching flow without the assistance of the cluster head.

Specifically, as shown in FIG. 8, in step 0, D2D communication similar to cellular communication is performed between the slave DUE and the cluster head, and the cluster head has a traditional cellular communication link with the base station.

In step 1, the slave DUE transmits a switch request to the cluster head, to indicate that the slave DUE is to switch from a D2D mode to a cellular mode. Here, a switchAssitanceTimer is arranged in the salve DUE, to indicate an assistance time of the cluster head. In a case that the slave DUE does not receive a switch response from the cluster head before the timer overflows, the slave DUE will trigger the traditional switching. A cell information list is included in the switch request transmitted by the slave DUE, and wireless bearer information before the D2D communication is stored in the cell information list.

In step 2, the cluster head prepares for a switching flow Specifically, the cluster head can predict an optimal target base station for the slave DUE based on measurement (from the potential cell list) of the base station. The cluster head can manage switchAssistanceInformation, to store assistance information for the slave DUE. In addition, the cluster head can count the SwitchAssistanceThreshold. In a case that the SwitchAssistanceThreshold is equal to |PotentialCellList| (the number of cells in the potential cell list), the cluster head fails to realize assistance random access, and the cluster head will notify the salve DUE of starting a traditional switching flow.

In step 3, the cluster head transmits a RA Preamble to the target base station.

In step 4, the target base station performs admission control.

In step 5, the target base station transmits a random access response (RA Response) to the cluster head. Specifically, the cluster head receives the RA Response, and records uplink grand (UL Grant), timing advance indication (timing advance indication) and temporary C-RNTI (temporary cell radio network temporary indication) in the switchAssistanceInformation (switch assistance information).

In step 6, the cluster head transmits a switch response (switch response) to the slave DUE, the switch response includes switchAssistanceInformation. The switch response includes for example UL Grant, Timing advance indication, cell information (for example PLMN (Public Land Mobile Network), a cell ID, a carrier frequency, traditional system information in MIB and SIB), temporary C-RNTI and so on.

In step 7, a RRC process is performed between the slave DUE and the target base station. Specifically, the salve DUE may transmit an RRCConnectionRequest (RRC connection request) to the target base station. And the target base station transmits RRCConnectionSetup (RRC connection setup) to the slave DUE. Then, the slave DUE can transmit RRCConnectionSetupComplete (RRC connection setup complete) to the target base station.

In step 8, the target base station transmits a signaling on UE context release (UE context release) to the cluster head. Here, the target base station notifies of the cluster head of successful switch. And the cluster head triggers releasing the resources.

In step 9, the cluster head releases the D2D resources, that is, wireless resources related to the slave DUE for mode switching, user data plane resources and control data plane resources.

In step 10, the cluster head transmits switch request acknowledge (switch request acknowledge) to the slave DUE. At this time, the slave DUE receives the switch request acknowledge, which indicates that the switch is successful.

A wireless communication method in a wireless communication system is described below. The wireless communication method includes: performing D2D communication under a cellular communication protocol with multiple UEs by an electronic device on a UE side in the wireless communication system, to directly transmit data information and/or control information to the multiple UEs; configuring, for a first UE and a second UE in the multiple UEs, resources and a MCS for performing the D2D communication between the first UE and the second UE. The second UE is a candidate object with which the first UE performs the D2D communication, and information indicating the resources and the MCS is transmitted to the first UE and the second UE.

Preferably, indication information indicating quality of a link between the first UE and the second UE is received from the first UE. The resources and the MCS for performing the D2D communication between the first UE and the second UE are configured in a case that the indication information indicates that the quality of the link meets a predetermined condition.

Preferably, in a case that the electronic device is located within a service scope of a base station equipment, switch request information indicating that the first UE is to perform the D2D communication with the second UE may be transmitted to the base station equipment, and switch request acknowledge information is received from the base station equipment. The switch request acknowledge information includes resource allocation information for the D2D communication between the first UE and the second UE, and the configuration is at least based on the switch request acknowledge information.

Preferably, in a case that the electronic device is located outside of the service scope of the base station equipment, resources are selected from a predetermined D2D communication resource pool to configure.

Preferably, indication information indicating quality of a link between the first UE and a third UE is received from the first UE, and the predetermined condition at least includes that the quality of the link between the first UE and the second UE is better than the quality of the link between the first UE and the third UE.

Preferably, information indicating that the third UE is a broadcasting information source for the first UE and the second UE may be received from the first UE and/or the second UE, it is determined that the first UE performs unicasting D2D communication with the second UE in a case that the present condition is met. A transmission frame number status for the first UE and the third UE may be received from the first UE, and the transmission frame number status is transmitted to the second UE, so that the first UE can continue to receive broadcasting information of the third UE from the second UE.

Preferably, HARQ for performing the D2D communication between the first UE and the second UE may further configured, and HARQ configuration information is transmitted to the first UE and the second UE.

Preferably, D2D communication connection assistance information for accessing into the second UE may be further configured for the first UE, and the D2D communication connection assistance information is transmitted to the first UE.

Preferably, the information indicating the resources and the MCS may be transmitted to the first UE and the second UE by a RRC signaling.

Another wireless communication method in a wireless communication system is described below. The wireless communication method includes: receiving from a first UE, by an electronic device on a UE side in a wireless communication system, information indicating resources and a MCS for performing D2D communication under a cellular communication protocol between the electronic device and a second UE; modulating and coding data to be transmitted based on the MCS information; and transmitting the modulated and coded data to be transmitted to the second UE via the resources to perform the D2D communication.

Preferably, the wireless communication method may include measuring quality of a link between the electronic device and the second UE, and transmitting indication information on the quality of the link to the first UE.

Preferably, the electronic device can perform D2D communication with a third UE before performing D2D communication with the second UE, can measure quality of a link between the electronic device and the third UE, and transmitting indication information on the quality of the link to the first UE.

Preferably, the electronic device may receive, from the first UE, at least one of measurement configuration information for measuring the quality of the link between the electronic device and the second UE; HARQ configuration information for the D2D communication between the electronic device and the second UE; and D2D communication connection assistance information for accessing into the second UE.

Preferably, the electronic device may transmit the assistance information to the second UE to access into the second UE, and receive an access response from the second UE. The access response may include at least one of timing advance and scheduling arrangement for the data to be transmitted.

Preferably, the electronic device may transmit acknowledge information indicating that the D2D communication with the second UE has been established successfully to the first UE after receiving the access response, and stop receiving information from the third UE.

Preferably, the electronic device may receive broadcasting information from the third UE via a D2D broadcasting link, and transmit a transmission frame number status between the electronic device and the third UE to the first UE, and establish unicasting D2D communication with the second UE with assistance of the first UE, and continue to receive the broadcasting information from the second UE.

Another wireless communication method in a wireless communication system is described below. The wireless communication method includes: measuring a base station equipment included in a potential cell list by an electronic device on a UE side in the wireless communication system; and predicting, based on a measurement result, a target base station equipment for a UE in a UE cluster which performs D2D communication.

Preferably, the wireless communication method may further include: receiving from the UE, switch request information indicating switching from a D2D communication mode to a traditional cellular communication mode, the switch request information includes information on a potential cell list.

Preferably, the wireless communication method may further include: transmitting random access preamble information to the target base station equipment; receiving random access response information from the target base station equipment; and transmitting switch response information to the UE based on the random access response information.

Preferably, in a case that the random access response information indicates that the access fails to, a further target base station equipment may be predicted from the remaining base station equipments included in the potential cell list, until the accesses succeeds.

Preferably, in a case that the access fails for all of base station equipments included in the potential cell list, information indicating performing traditional switching from the D2D communication mode to the traditional cellular communication mode is transmitted to the UE.

Preferably, in a case that the random access response information still indicates that the access fails when a predetermined time elapses after the switch request information is received, information indicating performing traditional switching from the D2D communication mode to the traditional cellular communication mode is transmitted to the UE.

Various implementation for various steps in the wireless communication method in a wireless communication system according to the embodiments of the present disclosure have been described in detail above, which are not described repeatedly any more.

An electronic device is further provided according to an embodiment of the present disclosure, the electronic device includes a processing circuit configured to: perform D2D communication under a cellular communication protocol with multiple UEs, to directly transmit data information and/or control information to the multiple UEs; configure, for a first UE and a second UE in the multiple UEs, resources and a MCS for performing the D2D communication between the first UE and the second UE. The second UE is a candidate object with which the first UE performs the D2D communication, and information indicating the resources and the MCS is transmitted to the first UE and the second UE.

An electronic device is further provided according to an embodiment of the present disclosure, the electronic device includes a processing circuit configured to: receive from a first UE, information indicating resources and a MCS for performing D2D communication under a cellular communication protocol between the electronic device and a second UE; modulate and code data to be transmitted based on the MCS information; and transmitted the modulated and coded data to be transmitted to the second UE via the resources to perform the D2D communication.

An electronic device is further provided according to an embodiment of the present disclosure, the electronic device includes a processing circuit configured to: measure a base station equipment included in a potential cell list; and predict, based on a measurement result, a target base station equipment for a UE in a UE cluster which performs D2D communication.

It should be understood that the electronic device described above can also perform other technical solution of the present disclosure described above, which is not described here any more for simplicity.

Obviously, operation processes in the wireless communication method in the wireless communication system according to the present disclosure can be implemented by a computer-executable program stored in a machine-readable storage medium.

The objective of the present disclosure can be realized by a way described as follows: a storage medium in which the computer-executable program code is stored is directly or indirectly provided to a system or a device, and a computer or a central processing unit (CPU) in the system or the device can read out and execute the program code described above. In this case, as long as the system or the device has a function of executing the program, the embodiment of the present disclosure is not limited to the program, and the program may be in any form, such as a target program, a program executed by an interpreter or a script provided to an operating system or the like.

The machine-readable storage medium described above may include but not limited to various storage or storage units, semi-conductor device, a magnetic disk unit such as an optical disk, a magnetic disk and a magnetic-optical disk, and other medium suitable for storing information.

In addition, the computer downloads and installs the computer program code according to the present disclosure by being connected with a website on the Internet, and then executes the program code, to realize the technical solution of the present disclosure.

Figure 9:
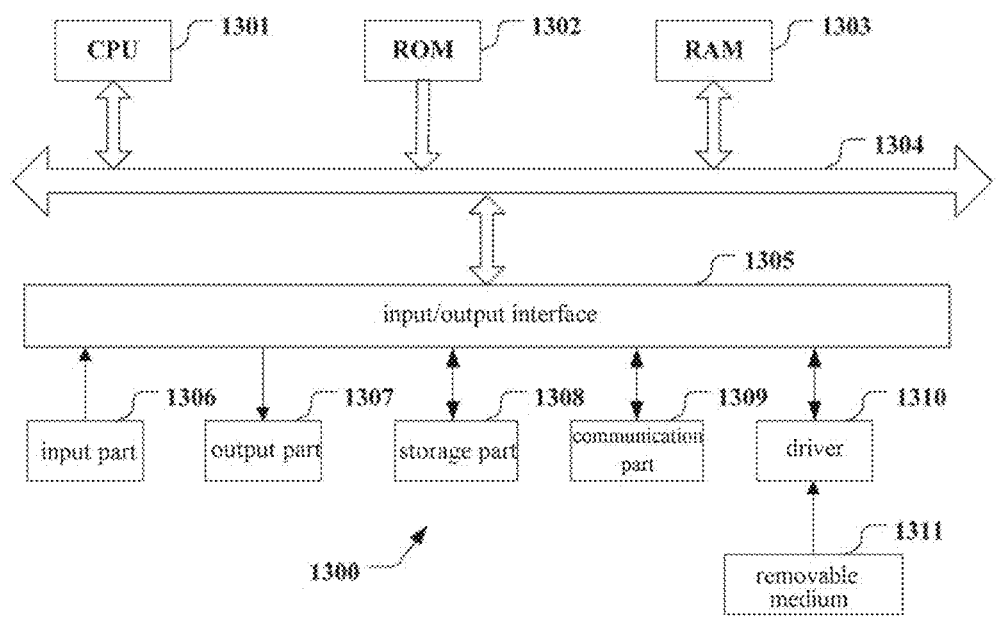
FIG. 9 is a block diagram of an exemplified structure of a general-purpose personnel computer for realizing a method for performing communication mode switch in a wireless communication system according to an embodiment of the present disclosure.

FIG. 9 is a block diagram of exemplary structure of a general-purpose personnel computer which can implement the wireless communication method in the wireless communication system according to the embodiments of the present disclosure.

As shown in FIG. 9, CPU 1301 executes various processing based on a program stored in a random-only memory (ROM) 1302 or a program loaded into the random access memory (RAM) 1303 from a storage part 1308. Data required when CPU 1301 executes various processing is stored in RAM 1303 as needed. CPU 1301, ROM 1302 and RAM 1303 are connected with each other via a bus 1304. An input/output interface 1305 is also connected with the bus 1304.

The input/output interface 1305 is connected with an input part 1306 (including a keyboard, a mouse and so on), an output part 1307 (including a display such as a Cathode Ray Tube (CRT) and a Liquid Crystal Display (LCD), a loudspeaker and so on), a storage part 1308 (including a hard disk), and a communication part 1309 (including a network interface card such as a LAN card, a modem and so on). The communication part 1309 performs communication processing via a network such as the Internet. A driver 1310 may be connected with the input/output interface 1305 as needed. A removable medium 1311 such as a magnetic disk, an optical disk, a magneto-optical disk and a semiconductor memory is installed in the driver 810 as needed, so that a computer program read from the removable medium 1311 can be installed in the storage part 1308 as needed.

In a case that the processing described above is implemented with the software, a program composing the software is installed from a network such as the Internet or a storage medium such as the removable medium 1311.

It should be understood by those skilled in the art that, the storage medium is not limited to the removable medium 1311 shown in FIG. 9 in which the program is stored and which is distributed separately from the device to provide the program to the user. The removable medium 1311 may be for example a magnetic disk (including a floppy disk (registered trademark)), an optical disk (including a Compact Disk Read-Only Memory (CD-ROM) and Digital Video Disk (DVD)), a magneto-optical disk (including minidisk (MD) (registered trademark)) and a semiconductor memory. Alternatively, the storage medium may be the ROM 1302, the hard disk included in the storage part 1308 or the like, in which the program is stored, and both the program and the device including the program are distributed to the user.

As described above, the present disclosure provides the electronic device on the user equipment side in the wireless communication system and the wireless communication method in the wireless communication system, to enhance an assisting role of the cluster head.

According to design described above for the present disclosure, many flows such as cell search, cell reselection, random access of the slave DUE can be omitted, to reduce signaling overhead, and rapidly realizing switch from the D2D mode to the traditional cellular mode.

In the system and method according to the present disclosure, obviously, components or steps can be decomposed or recombined. The decomposition or recombination are regarded as equivalent solutions of the present disclosure. Also, steps for implementing the processing described above may) be performed in chronological order illustrated naturally, however, it is unnecessary to perform the steps in the chronological order. Some steps can be performed in parallel or can be performed separately.

Although the embodiments of the present disclosure are described in detail above in conjunction with the drawings, it should be understood that the embodiments described above are only used to illustrate the present disclosure, and are not intended to limit the present disclosure. For those skilled in the art, various changes and alterations can be made to the embodiments described above without departing from the sprit and scope of the present disclosure. The scope of the present disclosure is limited only by the appended claims and an equivalent concept thereof.

The invention claimed is:

1. An electronic device on a user equipment side in a wireless communication system, comprising:
   circuitry configured to
   perform device-to-device (D2D) communication under a cellular communication protocol with a plurality of user equipment, to transmit data information and/or control information to the plurality of user equipment directly;
   receive first indication information indicating quality of a link between the first user equipment and the second user equipment from the first user equipment;
   receive second indication information indicating quality of a link between the first user equipment and a third user equipment from the first user equipment;
   determine whether the quality of the link between the first user equipment and the second user equipment is better than the quality of the link between the first user equipment and the third user equipment; and
   in a case that it is determined that the quality of the link between the first user equipment and the second user equipment is better than the quality of the link between the first user equipment and the third user equipment, determine the second user equipment as a candidate object with which the first user equipment performs the D2D communication, wherein the circuitry is further configured to:
   transmit switch request information indicating that the first user equipment is to perform the D2D communication with the second user equipment to a base station equipment;
   receive switch request acknowledgement information from the base station equipment, wherein the switch request acknowledge information contains resource allocation information for the D2D communication between the first user equipment and the second user equipment; and
   configure resources and a modulation and coding scheme (MCS) for performing the D2D communication between the first user equipment and the second user equipment at least based on the switch request acknowledgement information.

2. The electronic device according to claim 1, wherein the circuitry is further configured to configure resources and a modulation and coding scheme (MCS) for performing the D2D communication between the first user equipment and the second user equipment by selecting resources from a predetermined D2D communication resource pool.

3. The electronic device according to claim 1, wherein the circuitry is further configured to:
   in a case that the predetermined condition is met, determine that the first user equipment performs unicasting D2D communication with the second user equipment, and receive a transmission frame number status for the first user equipment and the third user equipment from the first user equipment; and
   transmit the transmission frame number status to the second user equipment, wherein the first user equipment continues to receive broadcasting information of the third user equipment from the second user equipment.

4. The electronic device according to claim 1, wherein the circuitry is further configured to:
   configure, for the first user equipment, D2D communication connection assistance information for accessing into the second user equipment; and
   transmit the D2D communication connection assistance information to the first user equipment.

5. The electronic device according to claim 1, wherein the circuitry is configured to transmit the information indicating the resources and the MCS to the first user equipment and the second user equipment through an RRC (Radio Resource Control) signaling.

6. An electronic device on a user equipment side in a wireless communication system, comprising:
   circuitry configured to
   perform device-to-device (D2D) communication under a cellular communication protocol with a plurality of user equipment, to transmit data information and/or control information to the plurality of user equipment directly;
   receive first indication information indicating quality of a link between the first user equipment and the second user equipment from the first user equipment;
   receive second indication information indicating quality of a link between the first user equipment and a third user equipment from the first user equipment;
   determine whether the quality of the link between the first user equipment and the second user equipment is better than the quality of the link between the first user equipment and the third user equipment; and
   in a case that it is determined that the quality of the link between the first user equipment and the second user equipment is better than the quality of the link between the first user equipment and the third user equipment, determine the second user equipment as a candidate object with which the first user equipment performs the D2D communication,
   wherein the circuitry is further configured to:
   configure, for the first user equipment and the second user equipment of the plurality of user equipment, resources and a modulation and coding scheme (MCS) for performing the D2D communication between the first user equipment and the second user equipment; and
   transmit information indicating the resources and the MCS to the first user equipment and the second user equipment.

7. An electronic device on a user equipment side in a wireless communication system, comprising:
   circuitry configured to
   perform device-to-device (D2D) communication under a cellular communication protocol with a plurality of user equipment, to transmit data information and/or control information to the plurality of user equipment directly;
   configure, for a first user equipment and a second user equipment of the plurality of user equipment, resources and a modulation and coding scheme (MCS) for performing the D2D communication between the first user equipment and the second user equipment, the second user equipment being a candidate object with which the first user equipment performs the D2D communication;
   transmit information indicating the resources and the MCS to the first user equipment and the second user equipment; and receive first indication information indicating quality of a link between the first user equipment and the second user equipment from the first user equipment, wherein in a case that the quality of the link indicated by the first indication information meets a predetermined condition, the circuitry is further configured to configure the resources and the MCS for performing the D2D communication between the first user equipment and the second user equipment, the circuitry is further configured to receive second indication information indicating quality of a link between the first user equipment and a third user equipment from the first user equipment, the predetermined condition at least comprises that the quality of the link between the first user equipment and the second user equipment is better than the quality of the link between the first user equipment and the third user equipment, and the circuitry is further configured to receive information indicating that the third user equipment is a broadcasting information source for the first user equipment and the second user equipment from the first user equipment and/or the second user equipment.

8. An electronic device on a user equipment side in a wireless communication system, comprising:
circuitry configured to
perform device-to-device (D2D) communication under a cellular communication protocol with a plurality of user equipment, to transmit data information and/or control information to the plurality of user equipment directly;
receive first indication information indicating quality of a link between the first user equipment and the second user equipment from the first user equipment;
receive second indication information indicating quality of a link between the first user equipment and a third user equipment from the first user equipment;
determine whether the quality of the link between the first user equipment and the second user equipment is better than the quality of the link between the first user equipment and the third user equipment; and
in a case that it is determined that the quality of the link between the first user equipment and the second user equipment is better than the quality of the link between the first user equipment and the third user equipment, determine the second user equipment as a candidate object with which the first user equipment performs the D2D communication,
wherein the circuitry is further configured to:
configure a hybrid automatic repeat request (HARQ) for performing the D2D communication between the first user equipment and the second user equipment; and
transmit HARQ configuration information to the first user equipment and the second user equipment.

9. An electronic device on a user equipment side in a wireless communication system, comprising:
circuitry configured to
measure quality of a link between the electronic device and a second user equipment;
transmit first indication information on the quality of the link between the electronic device and the second user equipment to a first user equipment;
measure quality of a link between the electronic device and a third user equipment;
transmit second indication information on the quality of the link between the electronic device and the third user equipment to the first user equipment;

receive, from the first user equipment information indicating resources and a modulation and coding scheme MCS for performing Device-to-Device (D2D) communication under a cellular communication protocol between the electronic device and the second user equipment, in a case that it is determined by the first user equipment that the quality of the link between the electronic device and the second user equipment is better than the quality of the link between the electronic device and the third user equipment;
modulate and code data to be transmitted based on the information indicating the resources and the MCS; and
transmit the modulated and coded data to be transmitted to the second user equipment through the resources, to perform the D2D communication.

10. The electronic device according to claim 9, wherein the circuitry is further configured to receive, from the first user equipment, at least one of measurement configuration information for measuring quality of the link between the electronic device and the second user equipment, Hybrid Automatic Repeat Request (HARQ) configuration information for the D2D communication between the electronic device and the second user equipment, and D2D communication connection assistance information for accessing into the second user equipment.

11. An electronic device on a user equipment side in a wireless communication system comprising:
circuitry configured to
receive, from a first user equipment, information indicating resources and a modulation and coding scheme MCS for performing Device-to-Device (D2D) communication under a cellular communication protocol between the electronic device and a second user equipment; modulate and code data to be transmitted based on the information indicating the resources and the MCS;
transmit the modulated and coded data to be transmitted to the second user equipment through the resources, to perform the D2D communication;
measure quality of a link between the electronic device and the second user equipment;
transmit first indication information on the quality of the link between the electronic device and the second user equipment to the first user equipment;
perform D2D communication with a third user equipment before performing the D2D communication with the second user equipment;
measure quality of a link between the electronic device and the third user equipment; and
transmit second indication information on the quality of the link between the electronic device and the third user equipment to the first user equipment.

12. The electronic device according to claim 11, wherein the circuitry is further configured to:
receive, from the first user equipment, at least one of measurement configuration information for measuring quality of the link between the electronic device and the second user equipment, Hybrid Automatic Repeat Request (HARQ) configuration information for the D2D communication between the electronic device and the second user equipment, and D2D communication connection assistance information for accessing into the second user equipment;
transmit the D2D communication connection assistance information to the second user equipment, to access into the second user equipment;

receive, from the second user equipment, an access response containing at least one of timing advance and scheduling arrangement for data to be transmitted; and after receiving the access response, transmit acknowledgement information indicating that D2D communication with the second user equipment has been established successfully to the first user equipment, and stop receiving information from the third user equipment.

* * * * *